(12) United States Patent
Raymond et al.

(10) Patent No.: US 6,469,082 B1
(45) Date of Patent: Oct. 22, 2002

(54) LOW VOC SOLVENT-BASED POLYCHLOROPRENE CONTACT ADHESIVE

(75) Inventors: Paul A. Raymond, Islip, NY (US); John S. Piwnlca, Jr., East Islip, NY (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 09/896,762

(22) Filed: Jun. 29, 2001

(51) Int. Cl.$^7$ .................... C08L 11/00; C08L 27/04; C08K 3/22
(52) U.S. Cl. .................... 524/273; 524/356; 524/433; 524/476; 524/551; 524/572; 524/611
(58) Field of Search .................... 524/433, 476, 524/572, 611, 551, 356, 273

(56) References Cited

U.S. PATENT DOCUMENTS 5,733,961 A * 3/1998 Purvis, II et al.

* cited by examiner

*Primary Examiner*—Tae H. Yoon
(74) *Attorney, Agent, or Firm*—Gunn, Lee & Hanor, P.C.; Michelle Evans

(57) ABSTRACT

A solvent based polychloroprene contact bond adhesive having less than 250 grams per liter volatile organic compounds (VOCs) at high solids content is disclosed. The composition contains polychloroprene polymer, phenolic and tackifying resins, a zinc resinate, metallic oxide and antioxidants, mixed uniformly in a blend of organic solvents. The blend of organic solvents contains VOC exempt solvents as well as aliphatic and aromatic solvents.

7 Claims, No Drawings

LOW VOC SOLVENT-BASED POLYCHLOROPRENE CONTACT ADHESIVE

BACKGROUND OF THE INVENTION

1. Field of The Invention

Applicant's invention relates to a solvent based adhesive at high solids in a solvent blend affording less than 250 grams per liter VOC content while maintaining exceptional contact bond adhesive properties.

2. Background Information

Presently, in the high pressure laminate (HPL) industry, solvent based or water borne contact bond adhesives are used to adhere a wide range of substrates, including wood in the form of particle board and plywood, plastics such as fiberglass, acrylonitrile-butadiene-styrene (ABS), metals such as steel, iron, aluminum, and the like. The adhesive is applied to both substrates using either a spraying or brushing technique. After the adhesive is applied, the coated substrates are allowed to dry at room temperature or dried on a conveyor in an oven to accelerate the removal of residual traces of solvent. This technique can be applied to post-forming countertops, cabinet, and furniture applications if needed. The substrates are then bonded with pressure to insure proper surface contact.

The contact bond adhesives are based on the polychloroprene polymer for its excellent properties imparted to the adhesive. The properties affected are rapid green strength development, aggressive grab tack, surface adhesion, open tack time, viscosity, spray characteristics, and bond strength development. Apart from the polychloroprene, phenolic resins and tackifiers added to the polychloroprene also play a major role in enhancing the adhesive properties synergistically. The phenolic resins when complexed with magnesium oxide increase heat resistance, bond strength and substrate adhesion of the adhesive. Resins such as rosin esters, polyterpenes, terpene phenolics, aromatic hydrocarbons, metallic resinates, and coumarone-indene resin affect bondability, tack and cohesive strength.

Metallic oxides such as magnesium oxide and zinc oxide are used. The magnesium oxide provides three advantages. First, it reacts with the phenolic resin to form a complex. Second, it functions as a curative. And third it acts as an acid acceptor thereby protecting sensitive substrates against released hydrochloric acid. The zinc oxide functions as a curative and as an acid acceptor.

Another important ingredient to the polychloroprene based adhesive is antioxidants such as hindered substituted phenols. These antioxidants protect the adhesive film from degrading on long-term aging of the bonded substrates.

The carrier or solvent medium for the solid ingredients is a blend of solvents typically aliphatics, ketones, esters, and aromatics. The optimum solvent blend is very important to the adhesive composition because the solvents influence polymer solubility, viscosity, spray characteristics, phasing, shelf life, open tack time, strength development, and evaporation time. It is desired to have a solvent blend that not only provides optimal characteristics to the adhesive, but also maintains a lower volatile organic compound content. At present only a few solvents are considered VOC exempt such as acetone, methyl acetate, and methylene chloride . However, both acetone and methyl acetate are poor solvents for polychloroprene in contact bond adhesives. Furthermore, methylene chloride is a restricted solvent due to its possible carcinogenic effect. Recently OSHA reduced the permissible exposure limit (PEL) for methylene chloride to 25 ppm.

Typically the HPL industry and other related industries use solvent based contact bond adhesives having a VOC content greater than 400 grams per liter. Recently, the California Air Quality District reduced the allowable limit of VOCs from 540 to 400 grams per liter and further reduced the maximum level to 250 grams per liter. No contact bond adhesive is known in the industry that has a VOC content as low as 250 grams per liter. In order to satisfy this need in the industry, the present adhesive was developed. Surprisingly, this adhesive exhibits exceptional contact bond adhesive characteristics without the regulatory disadvantages normally associated with high VOC content contact adhesives.

Evaluation and comparative testing were made of the present invention, designated T245 for the comparison study, with C2725, a typical extremely flammable polychloroprene adhesive found on the market today in the United States excluding some areas of California. The technical data for both compounds is as follows:

|  | C2725 | T245 |
| --- | --- | --- |
| Base Polymer | Compounded Polychloroprene | Compounded Polychloroprene |
| Solvent | Blend of Hydrocarbons and Ketones | Blend of Hydrocarbons and Ketones |
| Viscosity | 150–250 cPs | 900–1100 cPs |
| % Solids by Weight | 19.5 +/– 2.0% | 40.5 +/– 1.5% |
| Weight per Gallon | 6.6 +/– 0.2 lbs./gal | 7.7 +/– 0.5 lbs./gal |
| Shelf Life | 1 year | 9 months |
| Coverage | 250–300 ft 2/gal | 550–700 ft 2/gal |
| Total VOC | 576.5 grams/liter (4.8 lbs./gal) | 245.4 grams/liter (2.05 lbs./gal) |

From these studies it was found that C2725 had higher bond strengths than T245, particularly at elevated temperatures. However, T245 did exhibit a greater increase in bond strength at lower temperatures over time compared to C2725 which is significant considering the total VOC content of T245 is less than half that of C2725.

SUMMARY OF THE INVENTION

The primary object of the present invention was to provide a novel solvent based polychloroprene contact bond adhesive having a volatile organic compound content less than 250 grams per liter at a high solids content while maintaining exceptional contact bond adhesive properties. The adhesive contains a low viscosity fast crystallizing polychloroprene polymer, a gel polychloroprene polymer, a heat reactive phenolic resin, an aromatic hydrocarbon plasticizer, a terpene phenolic resin, an aromatic hydrocarbon resin, a zinc resinate, an antioxidant, an alkaline earth metal oxide, and water in a blend of solvents including hexane, acetone, methyl acetate, and toluene. The composition of the present invention is useful to a practitioner since it provides for a VOC level less than 250 grams per liter according to the guidelines set forth by California Air Districts EPA Method 24 and provides exceptional contact bond adhesive properties.

DETAILED DESCRIPTION OF THE PREFERRED EMBODIMENT

Before the composition was processed, the volatile organic compound (VOC) content of the solvent blend in the formulation was computed using the selected solvents, acetone, methyl acetate, toluene, and hexane. The solvent selection process is determined by comparing solubility parameter and hydrogen bonding index. The comparison allows for the prediction of solvent strength of the proposed blend, modification of the characteristics of a blend in a desired direction, and design of the final blend. Though there are a number of commonly used solvents, only a few of them have sufficient solvency to provide better viscosity, evaporation rate, sprayability and odor for the present application. Toluene has the greatest solvency, but can only be used at low concentrations because it is a VOC and has ozone depletion potential (ODP). The aliphatic solvents have sufficient solvency only in combination with ketones. The solvent blend chosen for the present invention affects reduced viscosity, adhesive solubility, open tack time, phasing, spray characteristics, and bond strength development.

As seen in Table 1, as the solids content of the composition is increased, the VOCs decrease and the viscosity increases. The high solids content is critical to achieving the low VOC content, but the solid ingredients had to be tailored to provide contact bond properties. The VOCs, solids, and viscosity are interrelated, but the present invention is specific to the blend of solvents that does not sacrifice other properties. The low VOC content of an adhesive is very dependent on VOC exempt solvents. When adhesives have 400–540 grams solids content per liter of VOCs the only exempt solvent used is acetone whereas in the composition of the present invention in order to reduce the VOC content two VOC exempt solvents, namely acetone and methyl acetate, are used.

TABLE 1

Comparison of Solids (% by weight), Viscosity (cps), and VOC's of contact bond adhesives.

| VOCs (grams/liter) | Solids (%) | Viscosity (cps) |
|---|---|---|
| 540 | 24 | 150 |
| 400 | 35 | 800 |
| <250 | 41 | 900 |

The typical method used to prepare the contact bond adhesive of the present invention at a solids content of 41% by weight consisted of first weighing the solid and liquid ingredients. The solid ingredients contained about 5–15% by weight of the fast crystallizing type polychloroprene polymer, about 5–15% by weight of the gel type polychloroprene, about 5–20% by weight of the heat reactive phenolic resin, about 0.1–1% by weight of an aromatic hydrocarbon plasticizer, about 10–20% by weight of a terpene phenolic resin, about 2–6% by weight of an aromatic hydrocarbon resin, about 2–5% by weight of a zinc resinate, about 0.5–2% by weight of antioxidants, about 0.5–2% by weight of magnesium oxide, and about 0.1–2% by weight of water. The polychloroprene polymers were milled on a laboratory open two-roll rubber mill to reduce gel and improve solubility. The milling of the polymers was carried out by passing the polymers through the cold tight nip roll approximately 4 to 6 passes. The solid ingredients along with the milled polymers were then added to the liquid ingredients, the solvent blend. The solvent blend contains about 5–10% hexane, about 30–40% acetone, about 10–15% methyl acetate, and about 5–10% toluene. The container is then placed on a rollator to mix uniformly overnight.

The solvent based adhesive's VOC content is determined by the equation specified by California Air Districts EPA Method 24 as indicated below.

CALIFORNIA AIR DISTRICTS EPA METHOD 24

GRAMS OF VOC PER LITER OF ADHESIVE, LESS WATER AND LESS EXEMPT

SOLVENTS is the weight of VOC per combined volume of VOC and adhesive solids, and is calculated by the following equation:

Grams of VOC per Liter of Adhesive, Less Water and $$\text{Less exempt Solvents} = \frac{Ws - Ww - Wes}{Vm - Vw - Ves}$$

Where:
Ws=weight of volatile solvent, in grams
Ww=weight of water, in grams
Wes=weight of exempt solvent, in grams
Vm=volume of adhesive, in liters
Vw=volume of water, in liters
Ves=volume of exempt solvents, in liters The fast crystallizing polychloroprene component has a low solution viscosity of 17 cPs at 5% solids in toluene on a Brookfield Model RVT Viscometer that provides a low viscosity and high solids to the adhesive. The low viscosity of the adhesive affords superior sprayability and the higher solids provide better dry weight coverage on the substrates. In addition, this polychloroprene provides green strength and strength development. Other polychloroprenes when used increase the adhesive viscosity at least two-fold. Excessive shearing of high viscosity polychloroprene polymers can provide low viscosity, but the ultimate strength and heat resistance of the adhesive is sacrificed. The gel polychloroprene contributes improved rheology and better sprayability at high solids content. This gel polychloroprene has a Mooney viscosity ML 1+4(100C) of 85–105. The preferred polychloroprene polymers used herein are available under the trade name NEOPRENE AD 5™ (fast crystallizing) and NEOPRENE AG™ (gel polymer).

The heat reactive phenolic resin provides heat resistance, adhesion, and bond strength development. These properties exist because these resins are reactive towards magnesium oxide through complex formation. Once the complex is formed, the network density is increased leading to higher heat resistance. In addition, the resin blend serves to increase solids at decreased viscosity.

The aromatic plasticizer, though at a low concentration, extends the open time and causes the adhesive film to be flexible and less brittle. The terpene-phenolic and aromatic hydrocarbon resins function as tackifiers by extending the tack retention, increasing aggressive grab tack, and contributing to a softer glue line. The zinc resinate is a zinc salt of rosin with a high melting point which contributes to increased heat resistance of the adhesive.

The two antioxidants are hindered phenolics, which protect against oxidative degradation on long term aging and acid tendering of sensitive substrates. The magnesium oxide in the presence of water forms a complex with the phenolic resin, which increases the heat resistance, bond strength, and adhesion of the adhesive. This also performs as a curative and as an acid acceptor. The blend of solvents that functions as the solvency medium or carrier for the solid ingredients includes an aliphatic (hexane), an aromatic (toluene) and two VOC exempt solvents, one ketone (acetone) and one ester (methyl acetate).

When use of the solvent based adhesive is desired, both surfaces to be adhered are coated with the adhesive. The adhesive can be applied to the surfaces by any suitable method, such as spraying or brushing. The most common method of application to the surfaces is by spraying. The adhesive is applied by a conventional air atomizing pressure feed system. The present invention was designed to have a spray pattern similar to that of a typical extremely flammable polychloroprene contact bond adhesive. The adhesive coverage providing the best properties for the invention can be achieved by providing the adhesion coverage in the range of 2.0 to 3.0 dry grams per square foot of the adhesive.

TEST METHODS

The adhesive composition of the present invention was evaluated for adhesive properties in terms of substrate evaluation, block shear edge, T245 to Bond Headliner, bond cleavage, open time, and heat softening.

Substrate Evaluation

Although T245 was specifically designed for the high pressure laminate market which typically utilizes laminate bonded to wood, the use of T245 on other substrate types was evaluated. In all cases, T245 had excellent bondability to aluminum, fiberglass, gel-coat, marine carpet, cargo liner, plywood, and headliner. The results in more detail are as follows:

| Substrates | Results |
| --- | --- |
| Aluminum to Laminate | A very strong bond was obtained. It was quite difficult separating the two substrates. Cohesive failure noted. |
| Marine Carpet to Gel-Coat | Strong bond resulting in carpet tear. |
| Cloth Backed Headliner to Gel-Coat | Strong bond. |
| Cloth Backed Headliner to Plywood | Strong bond with slight wood tear. |
| Indoor/Outdoor Carpet (Cargo Liner) to Fiberglass | Strong bond. |
| Cloth Backed Headliner to Fiberglass | Strong bond. |
| Cloth Backed Headliner to Aluminum | Strong bond. |
| Marine Carpet to Aluminum | Strong bond resulting in carpet tear. |

Block Shear

The block shear test measures the shear strength of the adhesive at room temperature and at elevated temperatures. Three bonded samples under the same conditions were prepared by spraying or brushing 2.0 in.×2.5 in.×0.5 in, of Birchwood spraying 2.5 to 3.0 dry grams of adhesive per square foot. Samples were bonded immediately together with a 0.5 inch overlap (lengthwise) and pressed together with hand pressure. The bonded area should be 4.0 square inches. All samples were equilibrated for 24 hours at room temperature. The samples prepared for the hot shear strength test were equilibrated at 120° F. in an air circulating oven prior to testing. Individual samples were pulled from the oven and tested immediately. Samples prepared for accelerated aging test were allowed to condition for 7 days at room temperature and then placed in an oven for 7 days at 158° F. Samples were allowed to equilibrate at room temperature for 4 hours prior to testing.

The block shear of the adhesive composition of the present invention was measured on a Lloyd's Tensile Test Machine at a crosshead speed of 0.1 inch per minute. The average of the results in triplicate was noted and is contained in Table 2.

TABLE 2a

Block Shear of Adhesive at Different Temperature and Aging Periods

| Aging Period | Room Temperature (lbf) | 120° F. (lbf) |
| --- | --- | --- |
| 3 days | 557 | 95 |
| 7 days | 727 | 137 |
| 7 days at RT/7 days at 158° F. | 1168 | 702 |

Additional tests were performed on adhesive test samples T245 and C2725. Both adhesives exhibited a decrease in shear value as the temperature increased. The decrease in bond strength as a result of temperature increase is more exponential as opposed to linear. C2725 demonstrated higher initial values at room temperature and 120° F. over T245. T245 later surpassed C2725 in room temperature and 120° F. values after one month (approximately 30% and 12% respectively). C2725 did demonstrate higher overall strength in cases at 140° F. This data is illustrated in further detail in Tables 2b and 2c.

TABLE 2b

Block Shear Maximum lbf Value of Adhesive T245 at Different Temperature and Aging Periods

| Aging Period | Room Temperature (lbf) | 120° F. | 140° F. |
| --- | --- | --- | --- |
| 1 day | 445.2 | 127.8 | 73.9 |
| 7 days | 1136.3 | 315.9 | 195.8 |
| 1 month | 1461.0 | 728.4 | 408.4 |

TABLE 2c

Block Shear Maximum lbf Value of Adhesive C2725 at Different Temperature and Aging Periods

| Aging Period | Room Temperature (lbf) | 120° F. | 140° F. |
| --- | --- | --- | --- |
| 1 day | 517.4 | 179.2 | 87.4 |
| 7 days | 843.3 | 426.5 | 326.8 |
| 1 month | 1129.3 | 649.7 | 516.1 |

Cleavage

The cleavage test determines the resistance to edge lifting at room temperature when a lifting force is applied. High-pressure laminates have a natural tendency to bend, expand, and contract under adverse conditions such as temperature, humidity, and mechanical stresses. For a bond cleavage test, samples of the laminate to particle board (4 in.×6 in.) were prepared for each test condition. The bonded area of the substrates was 20 square inches. In preparing the samples, the adhesive was sprayed providing 2.5 (+/−0.3) dry grams of adhesive per square foot.

The substrates were kept at ambient conditions for 10 to 15 minutes, then bonded together with a 1 in. overlap (lengthwise) and pressed together in a vice.

Samples were secured in a specially designed jig for cleavage testing and then tested using a Lloyd's tester. An average of results in triplicate was noted and is provided in Table 3.

TABLE 3a

Cleavage of Adhesive at Room Temperature and Aging Periods.

| Aging (days) | Room Temperature (lbf) |
|---|---|
| 1 | 73 |
| 7 | 73 |

Additional tests were performed on adhesive test samples T245 and C2725. Both adhesives exhibited a steady decline in strength values with increasing temperature, which occurred more in a linear fashion within the given temperature range as dictated by the test protocol. Although C2725 had the greatest strength overall, T245 displayed the greatest increase in bond strength over time. This data is shown in Tables 3b and 3c.

TABLE 3b

Cleavage Maximum lbf Value of Adhesive T245 at Different Temperature and Aging Periods

| Aging Period | Room Temperature (lbf) | 150° F. | 200° F. | 250° F. |
|---|---|---|---|---|
| 1 day | 84.9 | 56.8 | 37.6 | 14.6 |
| 7 days | 86.2 | 72.9 | 52.5 | 23.7 |
| 1 month | 85.3 | 78.0 | 62.7 | 40.1 |

TABLE 3c

Cleavage Maximum lbf Value of Adhesive C2725 at Different Temperature and Aging Periods

| Aging Period | Room Temperature (lbf) | 150° F. | 200° F. | 250° F. |
|---|---|---|---|---|
| 1 day | 112.1 | 79.2 | 59.9 | 38.2 |
| 7 days | 114.1 | 91.5 | 68.2 | 57.9 |
| 1 month | 100.5 | 85.4 | 66.2 | 63.8 |

Edge-lift

A one square foot section of laminate and particleboard were sprayed for each adhesive (C2725 and T245). The substrates were allowed to dry for approximately 15 minutes before bonding together and pressed with a 3-inch J roller. The bonded samples were allowed to stand for approximately one week prior to testing. The assembled samples were then placed in a convection oven set for 158° F. (70° C.).

After several hours, a slight degree of edge-lifting (laminate pulling up and away from the particleboard along the edges) was noted on the T245 sample. Edge-lifting under these conditions would be indicative of the probability that such an occurrence may occur in a postforming application. As a result, T245 would not be recommended for postforming applications. C2725 did not exhibit any edge-lifting.

Open Time

The solvent based contact bond adhesives are characterized by open time, tack time, or bonding range. This time is defined as that time between the time when the solvent has evaporated and the time when the adhesive has no affinity for itself. The adhesive and cohesive strengths of an adhesive normally will increase, reach a maximum, and decline to zero during the bonding range period. That time when an adhesive normally achieves its highest strength is called the optimum open time. The cleavage test jig was used for testing the bond strength. Three samples were prepared in the same manner as described for the cleavage tests. Each set was immediately pulled after each time interval and the average of the three samples was noted. This data is contained in Table 4.

TABLE 4

Open Time of Adhesive at Different Times at Room Temperature

| Open Time (minutes) | Room Temperature (lbf) |
|---|---|
| 5 | 77 |
| 10 | 72 |
| 20 | 62 |
| 40 | 66 |

Additional tests were performed on test samples T245 and C2725. It was found that C2725 has exceptional heat resistance greater than 300° F. T245 did have a heat resistance of 195° F. For this type of test, a heat resistance in excess of 180° F. is generally sought after for headliner-type applications.

T245 to Bond Headliner

T245 was used to bond both foam-backed and cloth-backed headliner to steel with a conventional air-assisted spray system. The dimensions for the substrates were 2"×5" for the headliner and 4"×6" for the steel. Sprayed substrates were bonded after 15 minutes and then pressed together with a small hand-roller. The headliner was placed onto the steel with a ½" overlap on either side. Two headliner pieces were put on each steel substrate piece. Bonded samples were allowed to equilibrate for one day, as well as one week, prior to testing.

Samples were suspended within a convection oven with either a 100-gram or 1-pound weight attached to the ½" overlapped portion of headliner at a 90° angle. The oven temperature began at 130° F. and was ramped 10° F. every fifteen minutes until adhesive failure (attached weight resting on oven floor after pulling strip apart). From this test it was found that C2725 exhibited excellent heat resistance across the board. T245 was able to support 1 lb per 2 square inches upwards of 180° F. and 100 gram weight on the same area in excess of 230° F. This would suggest that although T245 does not have the heat resistance shown by C2725, it may well be high enough for headliner applications. The results from this test are shown in more detail in Tables 5a and 5b.

TABLE 5a

Adhesion Failure Temperature/Headliner Application at Different Aging Periods and Different Weights for Foam-Backed Headliner

| Aging Period | Weight | Temperature (° F.) T245 | Temperature (° F.) C2725 |
|---|---|---|---|
| 1 day | 100 grams | 230 | >300 |
|  | 1 lb | 170 | >300 |
| 7 days | 100 grams | 270 | >300 |
|  | 1 lb | 180 | >300 |

TABLE 5b

Adhesion Failure Temperature/Headliner Application at Different Aging Periods and Different Weights for Cloth-Backed Headliner

| Aging Period | Weight | Temperature (° F.) T245 | Temperature (° F.) C2725 |
|---|---|---|---|
| 1 day | 100 grams | 230 | >300 |
|  | 1 lb | 180 | >300 |
| 7 days | 100 grams | 290 | >300 |
|  | 1 lb | 190 | >300 |

180 Hot Peel

The 180 hot peel test method was used to determine the shear adhesion failure temperature (SAFT) of the adhesive. A heat softening test for the adhesive was run in duplicate for consistent results. One-inch wide cotton duct strips were cut into 12 long pieces. Each test required four pieces of equal dimension. Four pieces were coated with the specific adhesive by spraying from a pressurized pot and allowed to dry for half an hour. A second coat was applied and allowed to dry for another half an hour. This way it formed a kind of substrate on the porous cotton duct strip. A third and final coat of adhesive was then applied, at which point the two strips were bonded to each other immediately. Light and uniform pressure was applied for bonding with a small hand roller. Following the uniform method, the adhesive was applied on the cotton strips and samples for tests were prepared. Thus, prepared samples were allowed to equilibrate at room temperature (70° F. and 50% relative humidity) for one week prior to testing.

The samples were suspended in an air circulating oven by one side of the cotton duct strip. The other side was peeled back 180 degrees and suspended with a one pound weight. The oven temperature was started at 120° F. and was increased 10° F. every 15 minutes until failure (the suspended weight dropped on the floor of the oven). The onset temperature of the peeling strips was noted and finally the dead load fell to the floor. This temperature was referred to as the heat softening temperature. The readings were recorded and an average of the two results was taken as the softening temperature for the adhesive. In this case, the heat softening temperature was 160° F.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. An adhesive comprising:

about 5–15% by weight of a fast crystallizing polychloroprene;

about 5–15% by weight of a gel polychloroprene;

about 5–20% by weight of a heat reactive phenolic resin;

about 0.1–1% by weight of an aromatic hydrocarbon plasticizer;

about 10–20% by weight of a terpene phenolic resin;

about 2–6% by weight of an aromatic hydrocarbon resin;

about 2–5% by weight of a zinc resinate;

about 0.5–2% by weight of antioxidants;

about 0.5–2% by weight of magnesium oxide;

about 0.1–2% by weight of water; and a solvent blend containing about 5–10% aliphatic solvent, about 30–40% ketone solvent, about 10–15% ester solvent, and about 5–10% aromatic solvent, whereby the resulting volatile organic compound content of said adhesive is less than 250 grams per liter.

2. The adhesive of claim 1, wherein said fast crystallizing type polychloroprene has a low viscosity of about 17 cPs at 5% solids in toluene.

3. The adhesive of claim 1, wherein said gel polychloroprene has a Mooney viscosity of ML 1+4(100C) of 85–105.

4. The adhesive of claim 1, wherein said aliphatic solvent is hexane.

5. The adhesive of claim 1, wherein said ketone solvent is acetone.

6. The adhesive of claim 1, wherein said ester solvent is methyl acetate.

7. The adhesive of claim 1, wherein said aromatic solvent is toluene.

* * * * *

UNITED STATES PATENT AND TRADEMARK OFFICE
CERTIFICATE OF CORRECTION

PATENT NO. : 6,469,082 B1
DATED : October 22, 2002
INVENTOR(S) : Paul A. Raymond et al.

It is certified that error appears in the above-identified patent and that said Letters Patent is hereby corrected as shown below:

<u>Title page,</u>
Item [75], Inventors, the second inventor name "John S. Piwnlca, Jr." should read -- John S. Piwnica, Jr. --.

Signed and Sealed this

Ninth Day of November, 2004

JON W. DUDAS
*Director of the United States Patent and Trademark Office*